(12) United States Patent
Day

(10) Patent No.: US 7,865,559 B1
(45) Date of Patent: Jan. 4, 2011

(54) MESSAGE DELIVERY COORDINATION AMONG MULTIPLE MESSAGING MEDIA

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 11/931,158

(22) Filed: Oct. 31, 2007

Related U.S. Application Data

(62) Division of application No. 10/894,931, filed on Jul. 20, 2004, now Pat. No. 7,305,069.

(51) Int. Cl.
   *G06F 15/16* (2006.01)
(52) U.S. Cl. ...................................... 709/206
(58) Field of Classification Search ................. 709/206; 455/434

See application file for complete search history.

(56) References Cited

U.S. PATENT DOCUMENTS

| | | | |
|---|---|---|---|
| 5,647,002 A | 7/1997 | Brunson | |
| 5,652,789 A | 7/1997 | Miner et al. | |
| 5,948,061 A | 9/1999 | Merriman et al. | |
| 6,021,181 A | 2/2000 | Miner et al. | |
| 6,405,035 B1* | 6/2002 | Singh | 455/414.1 |
| 6,609,148 B1 | 8/2003 | Salo et al. | |
| 6,618,710 B1 | 9/2003 | Zondervan et al. | |
| 6,631,398 B1 | 10/2003 | Klein | |
| 6,671,355 B1 | 12/2003 | Spielman et al. | |
| 6,782,415 B1* | 8/2004 | Quine | 709/206 |
| 6,850,982 B1 | 2/2005 | Siegel | |
| 2003/0125024 A1* | 7/2003 | Numminen et al. | 455/434 |
| 2006/0002522 A1 | 1/2006 | Bettis et al. | |

OTHER PUBLICATIONS

Lennox, et al., "CPL: A Language for User Control of Internet Telephony Services", "Internet Engineering Task Force Internet Draft" Apr. 2004, pp. 1-65.

* cited by examiner

*Primary Examiner*—Nathan Flynn
*Assistant Examiner*—Jeong S Park
(74) *Attorney, Agent, or Firm*—BainwoodHuang

(57) ABSTRACT

Presently disclosed are apparatus and methods for coordinating the delivery of messages and/or message notifications among multiple messaging media and message services so that the successful delivery of one copy of a message results in the deletion of other, redundant message copies still in transit to the recipient and the cancellation of any other message waiting notifications still pending. The system may be implemented with a network-connected device (such as but not limited to a server, switch, or router) containing or having connected to it a user interface, a coordination server, and a plurality of message services. Embodiments of the invention thus provide message delivery management that is more user-friendly, computationally- and resource-efficient and more adaptable to changing user preferences and user locations/addresses.

9 Claims, 5 Drawing Sheets

MESSAGE DELIVERY COORDINATION AMONG MULTIPLE MESSAGING MEDIA

CROSS REFERENCE TO RELATED APPLICATIONS

This is a Divisional patent application claiming the benefit under 35 USC §120 of U.S. application Ser. No. 10/894,931, the entire teachings of which are hereby incorporated by reference.

BACKGROUND

In the modern world, a person attempting to send a message to a recipient is faced with a plethora of communications choices. A sender typically has access to multiple addresses and contact numbers for each recipient in his or her address- or phonebook, such as the familiar email, home and/or office phone, fax, pager, mobile phone, or voice-enabled personal digital assistant (PDA) numbers. Many recipients will also have more than one email address, for example email; addresses for work, home, private, or mobile (Web-accessible) systems. Even when the recipient uses only a single type of message media/technology (such as the telephone), there can be different points of contact. Which number to call first or which email address to try first is up to the sender of the message.

If a sender initially attempts a voice call and does not reach the recipient on the first try, he or she typically leaves a message using a conventional message service. If the phone number connects to a system with voicemail features, the sender can readily leave a message there. If, however, there is no voicemail capability at the called number, the sender must leave a message with a human receptionist (if there is one) or try another number. Even if he or she leaves a message (whether live, and therefore subject to distortion or loss, or in a voicemail system), or if no voicemail is available, the sender may still desire contact with the recipient and will often times turn to email.

In a further complication, some conventional telephone answering systems also provide the choice of sending a page (either in all numeric or alphanumeric form) to the recipient. When the subject is especially urgent, callers may even call all of the phone numbers they have, as well as send email to all of the addresses in their phonebook. Moreover, some email systems, upon receipt of an email marked "urgent," also send out a page to the recipient, using a "delivery fork."

Even after the sender records their message, the sender still must wait for actual delivery to the recipient. This ultimate delivery requires an action by the recipient: he or she must activate or access the message service and its associated output device in order to see and/or hear the message. Typical message services used today with phone numbers include (for example) stand-alone answering machines and electronic voicemail systems. Email addresses themselves represent a messaging system, of course: the email server used by and client software installed on the recipient's computer. Pager numbers likewise represent a messaging system consisting of (at least in part) the paging call receiver, its associated radio network, and the recipient's pager device. As noted above, conventional output devices and their associated message services include, for example, email client software in an email message service, the telephone handset used to access a voicemail message service, and the pager device used to receive pages in a paging message service. Clearly, the message itself has little effect until the recipient both knows it has arrived at the output device and sees or hears it.

The recipient bears the burden of this messaging overload: he or she may find, in an especially urgent situation, voicemail messages in each of several systems, multiple email messages (which, thanks to the magic of email forwarding, may be duplicated amongst the recipient's several email addresses), and a repeatedly buzzing pager.

Numerous communications and messaging management systems that attempt to coordinate messaging a recipient (i.e., the sending of messages to a recipient user) are known in the art. For example the Wildfire system, disclosed in U.S. Pat. Nos. 5,652,789; 6,047,053 (a continuation of the patent application that matured into the '789 patent); and 6,021,181, all issued to Miner et al. and incorporated herein by reference in their entireties, is a system for routing incoming calls in a telephonic system using an electronic assistant. The Wildfire system, however, does not disclose managing the delivery of multiple, redundant messages from a single sender left for a recipient user. Instead, Wildfire manages the sender's actions so that only a single message is recorded for later delivery.

Another conventional approach to intelligently routing messages is described in U.S. Pat. No. 6,618,710 to Zondervan et al., incorporated herein by reference in its entirety. Zondervan et al. discloses an apparatus and method for intelligently routing electronic messages to computers and pagers. The method monitors whether a recipient user appears to be at a computer workstation and, if so, it forwards the electronic messages to the workstation. If, however, no user activity is detected at the designated workstation, the electronic message is instead forwarded to the recipient user's pager. Zondervan et al. does not generate multiple copies of a message; rather, it only decides where to route a single message.

Some message-routing systems rely on so-called "presence" systems to route messages based on directory information on where a user "is" (in terms of the user's most-current address or phone/pager number) at a particular time. These systems attempt to manage call completion by collecting and publishing a subscriber's current contact information and contact media, such as the subscriber's email addresses, phone (both fixed and land-line and mobile) numbers, and pager numbers. This contact information may also be associated with a schedule describing when the subscriber is available and via which media. Presence systems are described in, for example, Internet Engineering Task Force (IETF) Requests for Comments (RFCs) 2778 and 2779, available at http://www.ietf.org/rfc/rfc2778.txt?number=2778 and http://www.ietf.org/rfc/-rfc2779.txt?number=2779 (respectively) and incorporated herein by reference in their entireties. Presence systems typically provide addressing coordination that enables one user (the sender) of the present system to locate and contact call another user (the recipient) more efficiently.

Some presence systems depend on the recipient to supply availability data to the system on the recipient's preferred and/or available messaging media, i.e., the phone or pager numbers and email addresses at which the recipient will be available for a defined period of time. These systems may be referred to as "push" systems because they require the recipient to "push" his or her availability/presence information to the presence server. Conventional examples of the systems are the Lotus® Sametime® (a.k.a. IBM Lotus Instant Messaging and Web Conferencing) and Jabber® products. Lotus and Sametime are registered trademarks of International Business Machines Corporation of Armonk, N.Y. Jabber is a registered trademark of Jabber, Inc. of Denver, Colo.

Presence systems do not, however, manage messages left by a sender in the various (and separate) messaging services typically attached to or associated with a recipient's various addresses and/or phone numbers.

The use of the Internet and other networks to carry telephony and other signals and thus provide message services is also known. The Session Initiation Protocol (SIP) is one area of effort in the IETF directed at a text-based protocol, similar to HTTP and SMTP, for initiating interactive communications services between users. Such sessions may include voice, video, chat, interactive games, and virtual reality applications. The current SIP effort involves creation of a draft standard (RFC 2543, incorporated herein by reference in its entirety) and to specify and develop proposed extensions to the protocol. A further related effort, described in IETF Internet Draft "draft-ietf-iptel-cpl-09.txt" (available at http://www.IETF.org/Internet-drafts/ and also incorporated herein by reference in its entirety), is directed at a Call Processing Language that can be used to describe and control Internet telephony services. This language is designed to be implementable on either network servers or user agent servers. Neither of these technologies deals with managing message delivery across multiple messaging media with multiple message copies.

U.S. Pat. No. 5,948,061 (to Merriman et al.) describes a means of targeting the delivery of advertisements on the Internet by ensuring that an advertisement displayed in a web page is well-matched to a user. One aspect of the disclosed targeting is making sure that it is not repetitive. However, such advertisement messages (ads) are not actually targeted at a single person but rather at a class of persons, and the ad display system works by deferring the selection of the ad delivered until it is needed to be displayed. The ad display system keeps an inventory of ads on a server and chooses a single ad for a viewer on demand. Such a system is not useful when advertising messages are too large to deliver promptly on demand, as reflected in the fact that ad servers have to place tight restrictions on how large an ad can be. In addition, such a system depends on the viewer "pulling" the ad, and is not workable for message systems that "push" a notification to the recipient after a message is received.

SUMMARY

There are significant deficiencies to the above-described conventional approaches. For example, when a caller leaves a message on a conventional voicemail system or other message service, that message is only retrievable from that particular system or service. If the sender leaves several messages in different voicemail systems, each message is retrievable (i.e., the recipient may cause it to be delivered by accessing the message service) independently of the others—and the retrieval of one does not delete the others. Furthermore, so-called integrated call management systems, which may maintain a single message copy accessible through multiple media or message services (e.g., by recording a single voicemail message and notifying the recipient of the message's existence through a conventional warble/stutter tone notification on a telephone handset, email, and/or a pager message), also fail to cancel or delete the other, redundant message waiting indications (especially email and pages) when the message is retrieved and consequently delivered to the recipient. Thus, when the recipient accesses any of the other media or message services, the same message will be waiting for retrieval and delivery.

In contrast to the above-described conventional approaches, embodiments of the present invention are directed to apparatus and methods for coordinating the delivery of messages and/or message notifications among multiple messaging media and message services so that the successful delivery of at least one copy of a message results in the deletion of all (or substantially all) other, redundant message copies still in transit to the recipient or waiting for retrieval and the cancellation of any other message waiting notifications still pending. The present invention thus reduces user annoyance and increases the efficient use of the recipient's time.

One embodiment of the invention is directed to a system for preventing the delivery of redundant message copies. This system consists (at least in part) of a user interface, a coordination server, and a plurality of message services connected thereto configured to distribute copies of a message under the control of the user and to communicate with the coordination server to determine whether to deliver or to delete each copy.

In another embodiment, the above system is implemented in a process or method that may be performed by a network-connected device, such as but not limited to a server, router, or other intermediary device configured to determine whether a copy of a message has already been delivered prior to delivering it.

Alternately, embodiments of the present invention may be implemented in a message service apparatus. Such a message service apparatus consists (at least in part) of a network interface configured to receive a message copy. Each time the recipient accesses the message service, a decision agent determines if the message has already been delivered by referring to a remote coordination server. If so, the message service deletes its (now redundant) copy. If not, the message service delivers the message, via a message delivery subsystem, and notifies the coordination server that the message has been delivered to the recipient.

The message service embodiment may also be implemented as a process for handling message copies. Such a process may run in (for example but not by way of limitation) a router, server, or other network intermediary or network edge device providing message services.

Still further embodiments of the present invention may be implemented in a server apparatus comprising a network interface, a user interface, a coordination server (CS) function, a message formatter, a message copier, and a management engine. The message formatter receives messages over the network interface and formats them (adding metadata) for distribution. The message copier sends the formatted messages out to various destination message services under control of the user interface and the management engine. The coordination server function provides a data repository storing the delivery status of each message copy. Status is reported to and updated at the coordination server by the destination message services using the metadata for CS addressing and message identification. In particular, when the CS receives notification that a message copy has been delivered, it notifies the other message services that other copies of that message (and related and pending "message waiting" notifications) have become redundant and are to be deleted.

The server embodiment may also be implemented as a process for managing message delivery from a server or other network-connected device, such as (but not limited to) a router, switch, intrusion detection system, firewall, gateway, or network processor.

A still further embodiment of the present invention may be implemented as a method of conveying a message from a first user to a second user. The method comprises receiving a notification signal that indicates when a first user (the sender) has transferred or sent a set of messages to a corresponding set of message systems and their delivery subsystems. This set of messages may consist of multiple copies of the same message or multiple messages regarding the same subject matter. The members of the set are sent or otherwise conveyed through different messaging media. The method further comprises receiving a subsequent delivery signal indicating that the recipient user has accessed at least one message in the set of messages using one of the delivery subsystems. In response to the delivery signal, the method deletes or otherwise suppresses the delivery of the remaining messages in the set of messages that were not accessed by the recipient. Suppression may be achieved by distributing a control signal to the set of delivery subsystem, such as a signal configured to set a flag for each un-accessed message. Alternatively, suppression may be achieved by causing the output devices that actually display the messages to the recipient user to deny delivery permission to the set of delivery subsystems corresponding to (and conveying) the un-accessed messages.

Note that suppression need not necessarily delete every redundant copy. Due to the nature of some messaging technologies (themselves well-understood in the art), it is not always possible to "recall" or prevent display of a message once that message has passed beyond a certain control point. For example, once a paging network radio has transmitted a page signal to a pager device and the device receives it, the pager stores the message and waits for the pager owner to read it. Many paging systems are unable to cancel or delete the message once it has been transmitted.

The above-described embodiments thus provide message delivery management across multiple messaging media, deleting (or causing to be deleted) redundant message copies upon successful delivery of one copy of a message. This system is therefore more computationally- and resource-efficient and more adaptable to changing user preferences and user locations/addresses.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention are directed to apparatus and methods for coordinating the delivery of a set of messages and/or message notifications among multiple messaging media and message services so that the successful delivery of one copy or version of a message in the message set results in the deletion of all other message copies in the set still in transit to, or waiting for, the recipient and/or the cancellation of any other message waiting notifications still pending.

Figure 1:
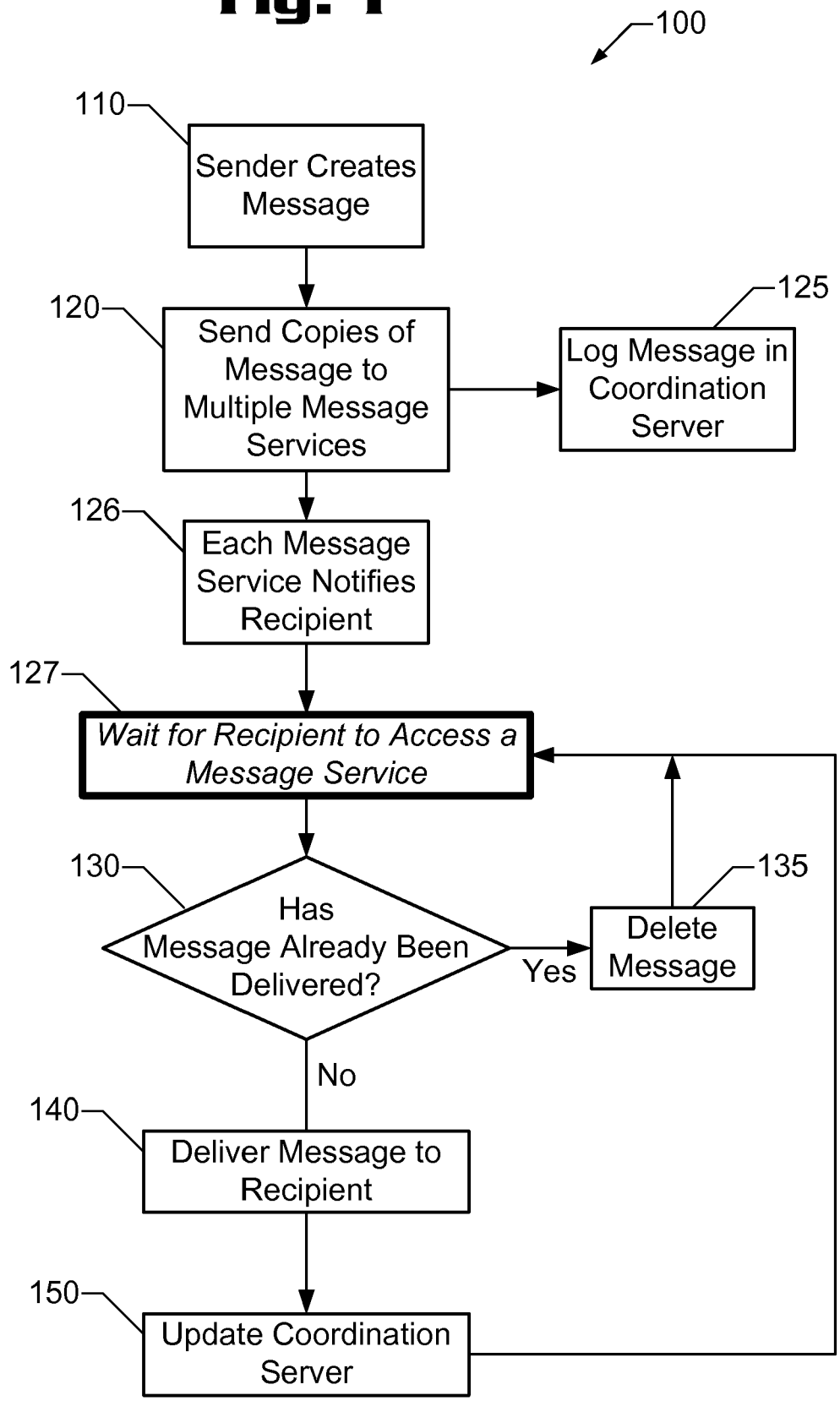
FIG. 1 is a high-level flowchart of a multi-copy message management system, according to one embodiment of the present invention.

FIG. 1 illustrates a high-level flowchart view of one embodiment of the present invention. Process 100 to depicts the method whereby a sender creates a message for a recipient user of the system and causes the distribution of that message through one or more message services with the assurance that redundant message copies will be deleted once one copy of the message has been delivered to the recipient. In particular, in step 110, the sender accesses the system through a user interface that may include (in some embodiments) a presence system or directory server, and creates a message for the recipient.

Copies (or other analogs) of the message are created in step 120 and forwarded to one or more message services for delivery over the corresponding message service media to the recipient. Message media employed by embodiments of the present invention may include voice recording, voicemail; email; analog, digital, numeric, or alphanumeric paging systems; instant messaging; video mail; or any other messaging system, now known or to be developed in the future configured to convey a message in any form to a recipient.

Information about the message is logged in a coordination server at creation, depicted by step 125. The information logged in the coordination server may include, in some embodiments, some or all of: the time and date that the message was created, the sender's identity, the recipient's address or addresses to which the message was directed by the sender, and the message itself.

Once received by a message service (MS), and necessarily prior to delivery of that message, each MS may optionally notify the recipient that a message is waiting, step 126. Such notification may be accomplished through conventional methods, e.g., by displaying a "new mail" icon in an email system or by illuminating a "message waiting" indicator on a voicemail-equipped telephone handset. In some embodiments of the invention, notification step 126 may be omitted.

Process 100 then enters a wait state 127 until the recipient accesses a message service.

Before delivering the local copy of the message to the recipient, (i.e., displaying a visual message and/or playing back a recoded audio message), each MS must first determine if a copy or version of the message was previously delivered by another MS in step 130. If the message has been delivered, the local copy of the message (i.e., the message copy specific to the MS) is deleted at step 135. If, however, the message has not been delivered, process 100 (and/or the message service) delivers the message in step 140 to indicate that message delivery is occurring (or has occurred), and updates the coordination server in step 150. In either case, process 100 then returns to wait state 128 in order to handle recipient accesses of other message services.

Note that the exact nature of the delivery determination step 130 and deletion step 135 may vary depending on the MS and the expected user interface typically seen with that MS. In some cases, the recipient may be completely unaware of a deleted message. In other cases, some tombstone placeholder or other artifact may be apparent to the recipient, or the recipient will have the experience of being notified and then discovering there is no actual message. The latter is less desirable, although it may be unavoidable when employing legacy messaging systems.

Test 130 may be implemented, in some embodiments, by querying the coordination server to determine if the message of interest has been marked or logged on that server as having been delivered. Alternatively, test 130 may use the Hypertext Transfer Protocol (HTTP) "GET" command to discern the status of the message in the CS. Since the coordination server may be implemented in a server utilizing a database or other data storage scheme, the query and response may take any of several well-known forms. Accordingly, construction of the coordination server, its logging systems and databases, and the query interface for test 130 may be readily accomplished by one of ordinary skill in the art without undue experimentation. Consequently, these aspects of the invention need not be further described.

When process 100 delivers the message in step 140, the message is not necessarily played to (in the case of an audio or video message) the recipient immediately. Rather, the message may only be passed to an ultimate delivery subsystem or output device responsible for displaying the message to the recipient user. For example, when one user sends an email message to another user, the message is first delivered to the recipient's email "inbox," resulting in a "new mail" notification. The message is not actually displayed to the recipient until the recipient (using the email client software) accesses the message for reading. As the term is used here, the recipient's act of accessing the email triggers the "delivery" of the message.

Stated another way, there is a boundary in the path from sender to recipient via each MS. The invention is applied to the last point at which it can both detect messages and affect messages. As a practical matter (dependant on the MS), there might be additional stages or processing steps before the message actually reaches the recipient, but the invention is applied at the last available control point and all subsequent stages are treated as being effectively "part of" the recipient.

While specialized client software may be used, in some embodiments of the present invention, to query the coordination server prior to displaying the message in the recipient's inbox and to indicate to the CS when the message is delivered, other embodiments may also use conventional client message software (as well as conventional display devices such as pagers) to perform the steps of the inventive method. Such embodiments may, for example, test for delivery status by remotely monitoring the data posted from each MS and deleting all message copies once they become redundant (discussed below with respect to FIG. 3). Alternatively, embodiments may test for delivery status prior to sending message copies to each MS, as discussed further below with respect to FIG. 4). Accordingly, the present invention is not limited to embodiments that require modified or adapted delivery subsystems (e.g., messaging client software) or output devices (e.g., a pager device).

Updating the coordination server in step 150 may be accomplished through one or more network connections to a coordination server function implemented or located remotely from the message service. The actual status update may be provided by conventional means, such as but not limited to passing a message or datagram to the server or by using a database update mechanism. The HTTP "POST" command may also be used to change the delivery status information.

Steps 140 and 150 are preferably performed as a single transaction, with ACID properties (atomic, consistent, isolation, durable). However, the techniques for achieving those properties may be too expensive or impossible in some embodiments and the invention can also be useful without transactional behavior.

Figure 2:
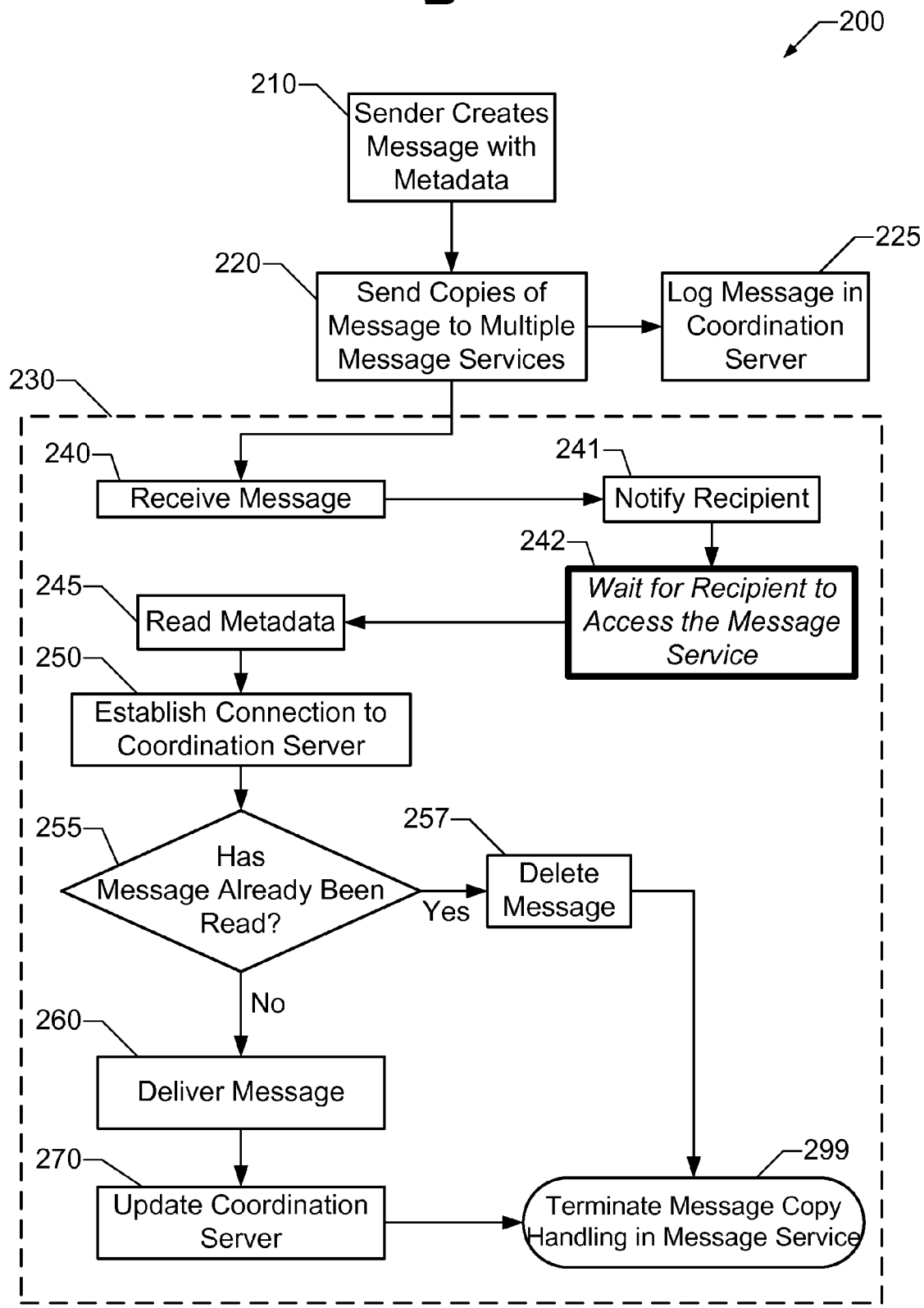
FIG. 2 is high-level flowchart of message service-based embodiment of a multi-copy message management system, according to one embodiment of the present invention.

FIG. 2 depicts an alternate embodiment of the process of FIG. 1. Here, process 200 begins with the sender creating a message, step 210, that has associated with it (or contained within it) metadata uniquely identifying the message and information about the message. As used herein, the term "metadata" refers to data about the message, including but not limited to a Uniform Resource Indicator (URI) or Uniform Resource Locator (URL) that identifies the network address of a particular coordination server used to log the message's delivery status. Metadata may be prepended or appended to the body of the message. It may also be embedded within the message. Alternatively, the metadata may be transmitted separately from the message (i.e., "out-of-band" transmission) to the message service and/or the CS.

Alternately, in a step before 210 (not shown), the sender may first get a tag (e.g., metadata) from the coordination server and embed it in the multiple message copies created in steps 210 and 220. The specifics of the embedding depend on the medium and are readily apparent to those of ordinary skill in the art. In this embodiment, no logging is necessary, as it is performed implicitly by embedding the information-containing tag.

Copies of the message and its associated metadata are generated and sent to multiple message services in step 220, and the fact of this transmission and other information indicative of the message services to which the messages and sent is logged in the coordination server in step 225.

Each message service follows essentially the same set of steps 230 to handle each message copy. The message is received in step 240 and the recipient is optionally notified that a new message has arrived in step 241.

Process 200 then enters wait state 242 until the recipient accesses the message service. At that point, step 245, the metadata associated with the message is read. Next, the message service establishes 250 a connection to the coordination server specified by the URI or URL in the message copy's metadata. The coordination server is queried in test 255 (via, e.g., a GET command or other database query) to determine if the message has already been read. If so, the current message copy is deleted in step 257 and message service handling of this message copy terminates in step 299.

If, however, query 255 to the coordination server indicates that the message has not yet been read, the message is delivered in step 260 and the "message read" status in the coordination server is updated in step 270. As noted above with respect to FIG. 1, message delivery in step 260 is not necessarily representative of the ultimate display of the message to the recipient user. Process 200 then concludes message handling in the MS in step 299.

Steps 260 and 270 are preferably performed as a single transaction, with ACID properties (atomic, consistent, isolation, durable). However, the techniques for achieving those properties may be too expensive or impossible in some embodiments and the invention can also be useful without transactional behavior.

Figure 3:
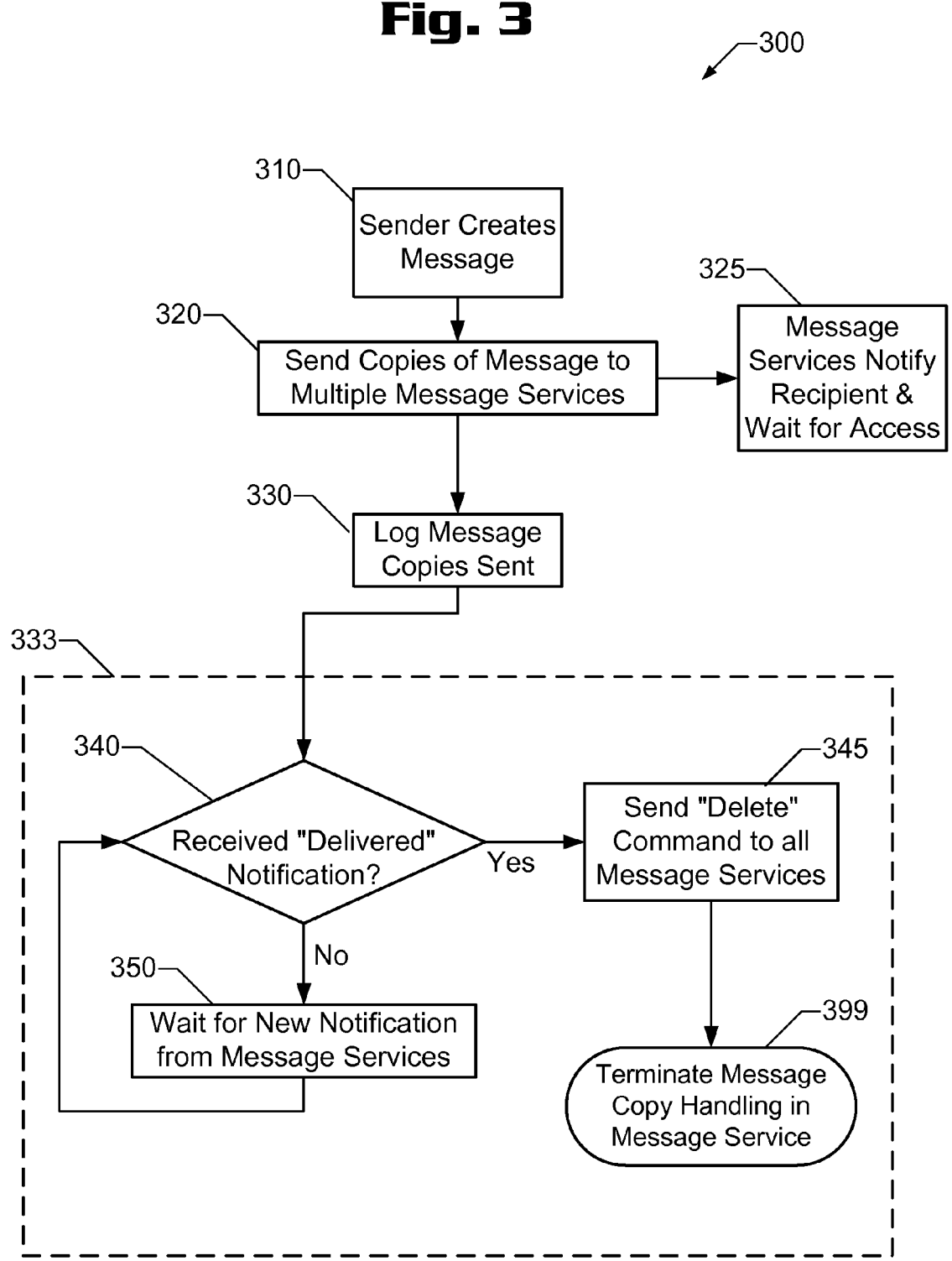
FIG. 3 is a high-level flowchart of a server-centric embodiment of a multi-copy message management system, according to one embodiment of the present invention.

The present invention may also be implemented through a process implemented within a coordination server. FIG. 3 illustrates a process 300 according to one such embodiment. Once again, the sender creates a message in step 310 and sends multiple copies of the message to various message services using various message media in step 320. The message services then each (optionally) notify the user, in step 325, and wait for the user to access the MS.

The coordination server logs or otherwise records data in step 330 indicative of the fact that the message copies were sent as well as information indicative of the message services to which the message copies were sent. Process 300 then enters a wait and process loop 333.

Periodically thereafter, the coordination server checks, in test 340, to determine whether a "delivery notification" (discussed further below) has been received from any of the message services to which the given message was sent. Such checking may be implemented using standard timer-based event testing of the contents of the CS database. Suitable timing intervals are on the order of several minutes, although longer intervals may be used when network traffic needs to be minimized.

If a delivery notification has been received, coordination server then sends out a "delete" command, step 345, to all the other message services indicating that the corresponding message copies (and/or pending message notifications) should be removed from the message services or otherwise deleted prior to delivery to the recipient. Processing of this message then terminates in step 399.

One of ordinary skill in the art will readily appreciate that a "delete command" functionality may be provided through many mechanisms. For example, the deletion of a message copy on command from the coordination server may be effected by causing the message service to remove the message copy from the message service data store or processor memory. Alternatively, the coordination server may cause the message service to cancel message delivery (e.g., such as in message services when a message is enqueued and waiting for user access). Furthermore, the coordination server may access (or activate) other means conventionally used in message delivery systems today to suppress or cancel message delivery. Accordingly, the invention is not limited by the means by which redundant messages are actually deleted or otherwise suppressed.

If periodic test 340 does not indicate a recent delivery notification, process 300 loops at step 350 to wait for the eventual receipt of the delivery notification.

The term "delivery notification" as used herein refers to any control signal, permission, interprocess message, post, flag, indicator, alert, or record (as those terms are conventionally used) sent to or stored within the coordination server to indicate that a message copy has been delivered or otherwise passed to the ultimate delivery subsystem or output device.

Figure 4:
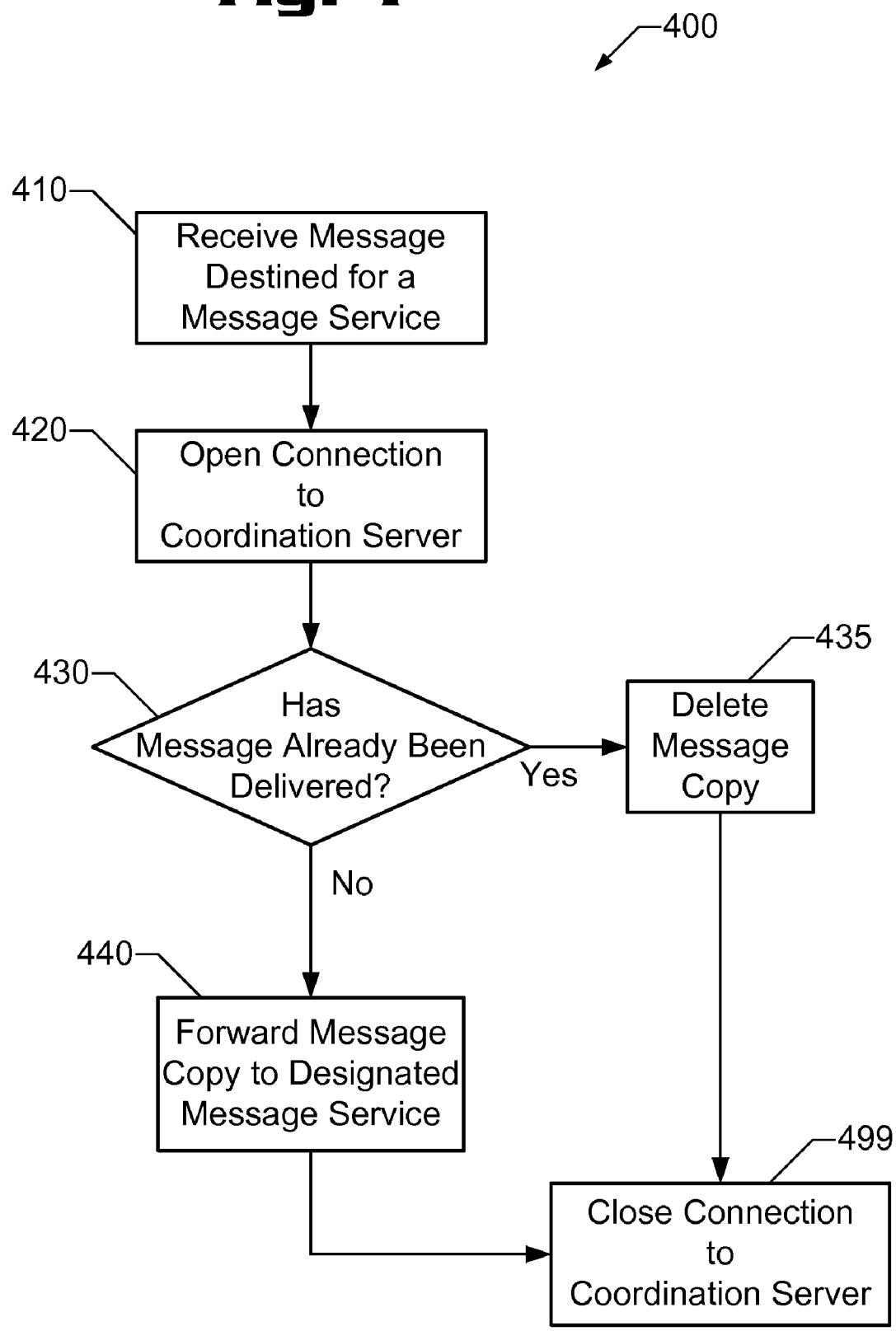
FIG. 4 is a high-level flowchart of an alternate embodiment of a multi-copy message management system employing processing functions in an intermediate network device.

FIG. 4 illustrates an alternate embodiment of the system 300 depicted in FIG. 3. Process 400 may be implemented in an intermediary (or intermediating) device in the network connecting the user interface, coordination server, and the message services. Process 400 begins at step 410 when the intermediary device receives a message copy destined for any of the message services reachable from the intermediary device. The intermediary device opens a connection to the coordination server in step 420 and tests, at step 430, whether the current message has already been delivered. Test 430 may be accomplished through a query or GET request to the CS or through any of the means disclosed with regard to steps 130 (FIG. 1) or step 255 (FIG. 2).

If the coordination server indicates that the message has been delivered, the intermediary device deletes the message copy, step 435, rather than forwarding it onward into or through the message service or services. Alternatively, if there is no indication that the message has already been delivered, the message is forwarded to the designated message service or services in step 440. Process 400 concludes at optional step 499, wherein the intermediary device closes its network connection to the coordination server. Step 499 is optional because, in some embodiments, it may be more efficient to maintain an open network connection between the intermediary device and the coordination server due to the volume of messages passing through a particular intermediary device.

Depending on the MS, deletion step 435 may involve additional activities or communication to ensure that bookkeeping information is properly updated and that all relevant parties are aware of the deletion. Such bookkeeping and log coordination is conventionally employed in message services today and, as such, is considered well within the capabilities of one of ordinary skill in the art. Accordingly, further discussion of the mechanics is not warranted.

Figure 5:
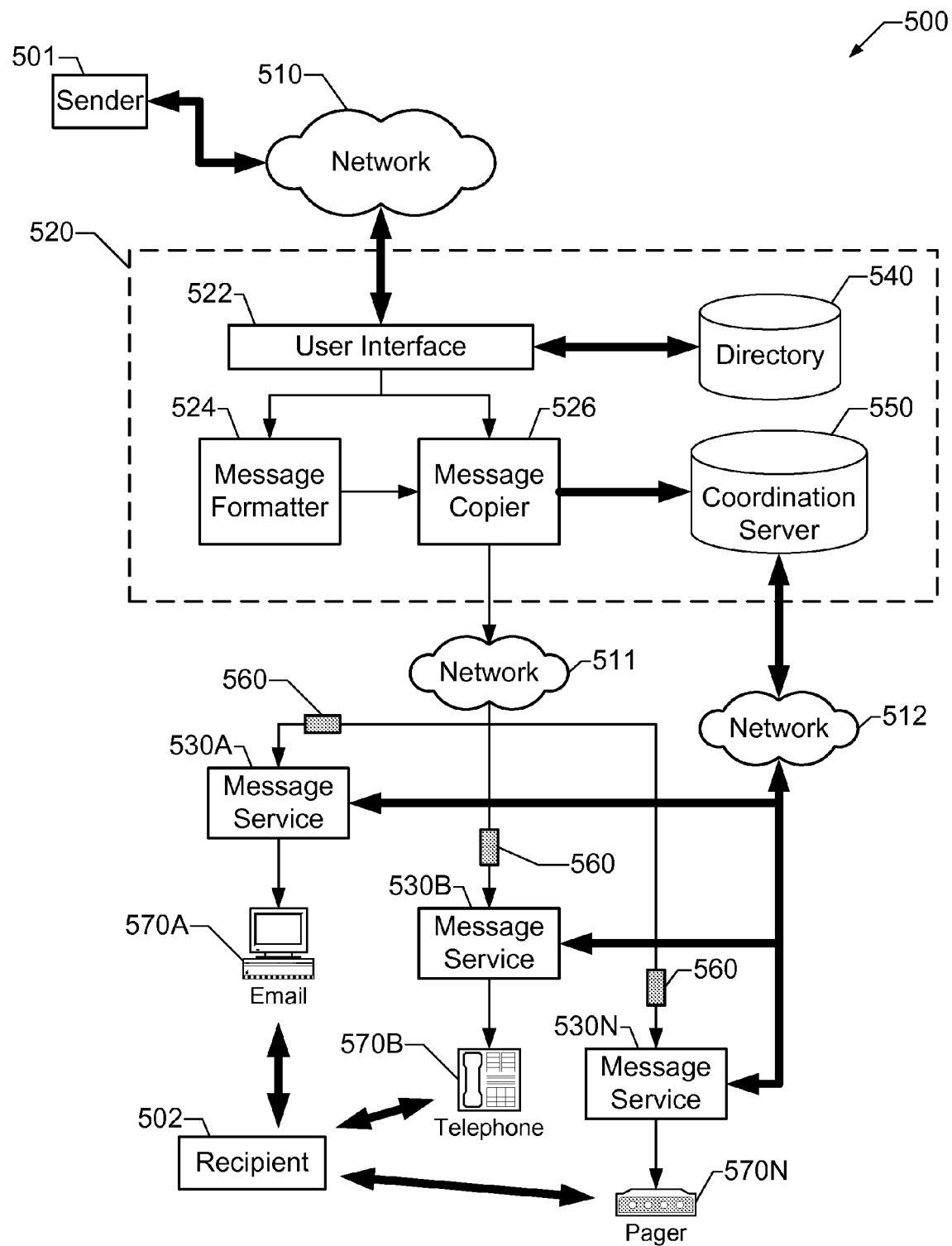
FIG. 5 is a block diagram of a multi-copy message management system according to various embodiments of the present invention.

FIG. 5 depicts an apparatus embodying implementations of the present invention. Apparatus 500, shown here as a system comprising a management engine 520 connected via network 511 to a plurality of message services 530A, 530B, and 530N, may (in general) be implemented in one or more computer devices. Such computer devices may be located in or connected via one or more networks 510, 511, and/or 512 disposed between a user sending a message 501 and the recipient user of that message 502.

Management engine 520, which also provides call gateway control and interface functions for sender 501, consists of user interface 522, message formatter 524, message copier 526, and network interfaces (not shown) to networks 510 and 511. User interface 522 provides command and control functionality for sender 501 to send messages to any user 502 of the system 500. In some embodiments of the invention, user interface 522 makes use of a directory or presence server 540 to obtain recipient information, phone numbers, and/or addresses. Directory or presence server 540 may be part of user interface 522 or may be remotely located in a physical device separate from that providing the user interface functionality. The connection between user interface 522 and directory server 540 may likewise be a direct physical connection or, alternatively, may rely on a network connection (not shown) for the exchange of data.

Although shown separately for illustrative clarity, there is no requirement that networks 510, 511, and/or 512 be distinct or physically separate. The connectivity represented by these networks may be provided over a single network of any type and scope or by multiple networks.

Sender 501, accessing management engine 520 via network 510, creates a message using message formatter 524. Message formatter 524 is, in some embodiments of the invention, a digital voice or audio-video recording system conventionally seen in the arts today. Message formatter 524 may also employ a user interface to one or more conventional message generation technologies, including but not limited to paging, voicemail, fax, text entry, optical character recognition (OCR), text-to-speech, or speech-to-text systems. Message formatter 524 operates under control of user interface 522 and derives its preferred mode(s) of operation from user input as well as stored preferences and rules. For example, and not by way of limitation, embodiments of the invention may expose the message services to the sender by listing the recipient's current preferred contact information and giving the sender the choice of which ones to send to. Message formatter 524 (operating in conjunction with message copier 526) must then format the message as required for each of the selected services. The recipient user's personal preferences (e.g., "no pages after 6 p.m." or "email only on Sundays") may be stored in the directory/presence server and used to create a menu of choices for the sender as well.

Alternatively, the message services and directory/presence information may be hidden from the sender by user interface 522. In some embodiments of the invention, the sender may have the configurable option of exposure to or isolation from the message service interfaces. The sender and/or the recipient may also have configurable options or preferences on the type and nature of system prompts, timeout values for how long the system (or a message service or the CS) should wait before it expires all copies of the message, and the like.

A set of arbitrarily complex rules, running in management engine 520 and having effect on user interface 522, message formatter 524, and message copier 540 may determine which addresses and phone numbers the message will be routed to based on, for example, message urgency or time of day. For example, the recipient may elect to have all emails containing attachments forwarded, regardless of whether they become redundant due to accessing a related voicemail, in order to always receive the attachments which cannot be received via voicemail.

Message copier 526, acting under control of user interface function 522, replicates the message created in message formatter 524 and transmits (or forwards) copies of the message to the appropriate message services 530 specified by sender 501 and/or directory/presence server 540. Message copier 526 also logs the creation and forwarding of message copies in coordination server 550 for later use in determining whether a particular copy of the message has been delivered. This logging may take the form of a notification signal that denotes the fact that a set of related message copies have been forwarded to the message services.

As with directory/presence server 540, coordination server 550 may be implemented as a part of management engine 520 or remotely in a separate physical device on a network (not shown) having web server functionality, a database or other data storage capability, and one or more network interfaces.

Coordination server 550 may include, in some embodiments of the invention, one or more network interfaces (not shown) enabling its connection to message copier 526 and message services 530 via network 512.

Message copies 560 are sent by message copier 526 over network 511 to the appropriate message services 530. Message services 530 each generally consist of a network interface (through which they connect to network 511), a decision agent or analogous control logic, and a delivery subsystem. The decision agent takes care of processing the incoming message according to the needs and requirements of the particular message service. A voicemail message, for example, typically causes a message waiting indicator light or special tone to appear on the appropriate telephone handset.

Coordination server 550 may also include a configuration option that determines or sets how messages are handled if the CS is not reachable or does not respond quickly enough. Such a policy option may be specific to (or determined by) each MS or may be described in metadata carried in each message.

The delivery subsystem typically includes an output device such as a telephone handset or pager. Alternatively, and as shown in FIG. 5, the output devices 570 may be physically separate from the MS and its delivery subsystem.

Although only three message services 530A, 530B, and 530N are shown in FIG. 5, one of ordinary skill in the arts will recognize that a multitude of message services can be targeted by message copier 526. Accordingly, the present invention is not limited to operation with only the three types of message services illustrated in FIG. 5 and encompasses within its scope operation with any type or number of message services.

By way of example and not of limitation, FIG. 5 illustrates the routing of a message copy 560 to email message service 530A, voicemail message service 530B, and pager message service 530N. As noted above, the problem to be avoided is the situation where recipient user 502 receives and reads the email supplied by (e.g.) message service 530A (using an email output device 570A, such as a personal computer) and is then forced to deal with redundant message copies presented by message services 530B and 530N on telephone output device 570B and pager output device 570N, respectively. System 500 avoids this problem, in one embodiment of the invention, by providing each message service 530 with the ability to query coordination server 550 (via network 512) to determine whether the message has been read by the recipient using another message service 530 prior to delivering the local message copy 560 to its output device 570.

In an alternate embodiment, coordination server 550 of system 500 includes the capability described with reference to process 300, illustrated in FIG. 3. In such an embodiment, coordination server 550 periodically checks its database for each message to determine if it has received a delivery notification (e.g., without limitation, a delivery signal or flag) from any message service 530. In cases where no delivery notification has been received, indicating that the recipient user has not accessed the message, coordination server 550 waits for predetermined period of time (e.g., five minutes) before checking again. If, however, a delivery notification has been received, coordination server 550 sends instructions, via network 512, to all of the other message services 530 instructing them to delete, disregard, or otherwise suppress delivery of their instances of (locally un-accessed) message copy 560.

In a still further alternate embodiment, the system query to the CS may take the form of an HTTP "GET" command or other request for permission to deliver the message. Denial of this permission request results from a determination that the delivery signal (i.e., a notification that delivery has already been made) has been received by the CS.

Although output devices 570 are described as the ultimate end-user devices responsible for presenting the message to recipient user 502, it is also to be understood that output devices 570 may include client software associated with the functioning of those units, as well as the generalized functionality of message delivery discussed above with respect to FIGS. 1 and 2. For example, but not by way of limitation, display unit 570A may consist of personal computer hardware (e.g., a CPU, monitor, keyboard, and mouse) running a personal computer operating system and (at a minimum) email client software such as Eudora® or Microsoft® Outlook®. Microsoft and Outlook are registered trademarks of the Microsoft Corp. of Redmond, Wash. Eudora is a registered trademark of QUALCOMM Inc. of San Diego, Calif.

Alternate Embodiments

One of ordinary skill in the art will recognize that while this invention can be described in terms of multiple message copies and accompanying systems that delete redundant copies when one copy of the message is delivered, one can also implement the invention as a system or method for distributing redundant pointers to a single message instance located, e.g., on a central server or some other central storage point. Alternatively, a set of pointers may be used to reference a corresponding set of messages stored on one or more central servers. In such embodiments, the invention operates on the pointers. Once a pointer is passed to the set of message services (via, e.g., a "message waiting" indicator or datagram containing the message pointer) and one message service signals (or is queried to determine) that the message has been delivered, the system causes or signals for the deletion of the redundant "message waiting" indicators/datagrams.

In general, suppression need not necessarily delete every redundant copy. Due to the nature of some messaging technologies (themselves well-understood in the art), it is not always possible to "recall" or prevent display of a message once that message has passed beyond a certain control point. For example, once a paging network radio has transmitted a page signal to a pager device and the device receives it, the pager stores the message and waits for the pager owner to read it. Many paging systems are unable to cancel or delete the message once it has been transmitted.

One of ordinary skill in the arts will also note that networks 510, 511, and 512 may be any form of network known today or to be discovered in the future. Such networks may include, without limitation, the public Internet, any form of private intranet, wide area networks (WAN), metropolitan area networks (MAN), local area networks (LAN), campus-wide or regional networks, or any other form of computer-to-computer interfacing. Accordingly, sender 501 may not only be remotely located from recipient user 502 but also from management engine 520, directory or presence server 540, coordination server 550, message services 530 and corresponding output devices 570.

The order in which the steps of the present method are performed is purely illustrative in nature. In fact, the steps can be performed in any order or in parallel, unless otherwise indicated by the present disclosure.

The method of the present invention may be performed in hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Furthermore, although the functionality of the elements of system 500 (disclosed in FIG. 5) is described in terms of separate physical devices, one of ordinary skill in the relevant network and computer arts will readily appreciate that such functionality may be partitioned amongst numerous physical devices through any other number of a well-known virtualization schemes and functional partitioning methods. Accordingly, embodiments of the invention are to be understood as not being limited by the physical boundaries of the devices performing the functions of apparatus 500 but rather to include any hardware and/or software functional organization and partitioning capable of performing the essential operations of the apparatus disclosed herein.

While this invention has been particularly shown and described with references to embodiments thereof, it will be understood by those skilled in the art that various changes in form and details may be made therein without departing from the spirit and scope of the invention as defined by the appended claims.

What is claimed is:

1. A method for conveying a message from a first user to a second user, the method comprising:
  receiving a notification signal indicating that the first user has transferred a set of messages to a set of delivery subsystems, the set of delivery subsystems enabling the second user to access the set of messages;
  after receiving the notification signal, receiving a delivery signal indicating that the second user has accessed one of the set of messages using one of the delivery subsystems of the set of delivery subsystems;
  in response to the delivery signal, suppressing un-accessed messages of the set of messages of the remaining delivery subsystems of the set of delivery subsystems;
  wherein an output device is initially configured to provide delivery permission to the set of delivery subsystems prior to receiving the delivery signal;
  wherein suppressing the un-accessed messages of the set of messages includes in response to receiving the delivery signal, configuring the output device to deny delivery permission to the remaining set of delivery subsystems;
  wherein following receiving the notification signal indicating that the first user has transferred the set of messages to the set of delivery subsystems;
  after expiration of a time interval checking a database to detect reception of a delivery notification indicating that the second user has accessed one of the set of messages using one of the delivery subsystems of the set of delivery subsystems;
  in response to detecting an absence of the delivery notification in the database, continuing to check the database to detect reception of the delivery signal after expiration of the time interval; and
  in response to detecting a presence of the delivery notification, suppressing un-accessed messages of the set of messages of the remaining delivery subsystems of the set of delivery subsystems.

2. The method of claim 1, wherein each message is associated with a flag, and wherein suppressing the un-accessed messages of the set of messages includes:
  distributing a control signal to the remaining set of delivery subsystems, the control signal being configured to direct the remaining set of delivery subsystems to set, for each un-accessed message, the flag associated with that un-accessed message to suppress that un-accessed message.

3. The method of claim 1, wherein the set of delivery subsystems is configured to deliver a local copy of the set of messages to the output device, the set of delivery subsystems configured as a boundary in a communication path with the output device.

4. An apparatus for conveying a message from a first user to a second user, comprising:
  means for receiving a notification signal indicating that the first user has transferred a set of messages to a set of delivery subsystems, the set of delivery subsystems enabling the second user to access the set of messages;
  means for receiving a delivery signal after receiving the notification signal, indicating that the second user has accessed one of the set of messages using one of the delivery subsystems of the set of delivery subsystems;
  means for suppressing un-accessed messages of the set of messages of the remaining delivery subsystems of the set of delivery subsystems in response to the delivery signal;
  wherein an output device is initially configured to provide delivery permission to the set of delivery subsystems prior to receiving the delivery signal;
  wherein means for suppressing the un-accessed messages of the set of messages further comprises means for configuring the output device to deny delivery permission to the remaining set of delivery subsystems in response to receiving the delivery signal;
  wherein following receiving the notification signal indicating that the first user has transferred the set of messages to the set of delivery subsystems;
  after expiration of a time interval means for checking a database to detect reception of a delivery notification indicating that the second user has accessed one of the set of messages using one of the delivery subsystems of the set of delivery subsystems;

in response to detecting an absence of the delivery notification in the database, means for continuing to check the database to detect reception of the delivery signal after expiration of the time interval; and in response to detecting a presence of the delivery notification, means for suppressing un-accessed messages of the set of messages of the remaining delivery subsystems of the set of delivery subsystems.

5. The apparatus of claim 4, wherein each message is associated with a flag, and wherein suppressing the un-accessed messages of the set of messages further comprises means for distributing a control signal to the remaining set of delivery subsystems, the control signal being configured to direct the remaining set of delivery subsystems to set, for each un-accessed message, the flag associated with that un-accessed message to suppress that un-accessed message.

6. A coordination server for use in conveying a message from a first user to a second user, the coordination server configured to:
   receive a notification signal indicating that the first user has transferred a set of messages to a set of delivery subsystems, the set of delivery subsystems enabling the second user to access the set of messages;
   after receiving the notification signal, receive a delivery signal indicating that the second user has accessed one of the set of messages using one of the delivery subsystems of the set of delivery subsystems;
   in response to the delivery signal, suppress un-accessed messages of the set of messages of the remaining delivery subsystems of the set of delivery subsystems;
   wherein an output device is initially configured to provide delivery permission to the set of delivery subsystems prior to receiving the delivery signal;
   wherein when suppressing the un-accessed messages of the set of messages the coordination server is configured to in response to receiving the delivery signal, configure the output device to deny delivery permission to the remaining set of delivery subsystems;
   wherein following receiving the notification signal indicating that the first user has transferred the set of messages to the set of delivery subsystems the coordination server is configured to:
   after expiration of a time interval check a database to detect reception of a delivery notification indicating that the second user has accessed one of the set of messages using one of the delivery subsystems of the set of delivery subsystems;
   in response to detecting an absence of the delivery notification in the database, continue to check the database to detect reception of the delivery signal after expiration of the time interval; and
   in response to detecting a presence of the delivery notification, suppress un-accessed messages of the set of messages of the remaining delivery subsystems of the set of delivery subsystems.

7. The coordination server of claim 6, wherein each message is associated with a flag, and wherein when suppressing the un-accessed messages of the set of messages the coordination server is configured to:
   distribute a control signal to the remaining set of delivery subsystems, the control signal being configured to direct the remaining set of delivery subsystems to set, for each un-accessed message, the flag associated with that un-accessed message to suppress that un-accessed message.

8. A computer program product having a non-transitory computer-readable medium including computer program logic encoded thereon that, when performed by a controller of a computerized device causes the computerized device to:
   receive a notification signal indicating that the first user has transferred a set of messages to a set of delivery subsystems, the set of delivery subsystems enabling the second user to access the set of messages;
   after receiving the notification signal, receive a delivery signal indicating that the second user has accessed one of the set of messages using one of the delivery subsystems of the set of delivery subsystems;
   in response to the delivery signal, suppress un-accessed messages of the set of messages of the remaining delivery subsystems of the set of delivery subsystems;
   wherein an output device is initially configured to provide delivery permission to the set of delivery subsystems prior to receiving the delivery signal;
   wherein when suppressing the un-accessed messages of the set of messages in response to receiving the delivery signal, configure the output device to deny delivery permission to the remaining set of delivery subsystems;
   wherein following receiving the notification signal indicating that the first user has transferred the set of messages to the set of delivery subsystems,
   after expiration of a time interval check a database to detect reception of a delivery notification indicating that the second user has accessed one of the set of messages using one of the delivery subsystems of the set of delivery subsystems;
   in response to detecting an absence of the delivery notification in the database, continue to check the database to detect reception of the delivery signal after expiration of the time interval; and
   in response to detecting a presence of the delivery notification, suppress un-accessed messages of the set of messages of the remaining delivery subsystems of the set of delivery subsystems.

9. The computer program product of claim 8, wherein each message is associated with a flag, and wherein when suppressing the un-accessed messages of the set of messages, the computerized device:
   distributes a control signal to the remaining set of delivery subsystems, the control signal being configured to direct the remaining set of delivery subsystems to set, for each un-accessed message, the flag associated with that un-accessed message to suppress that un-accessed message.

* * * * *